(12) United States Patent
Ungar (10) Patent No.: US 7,089,541 B2
(45) Date of Patent: Aug. 8, 2006

(54) MODULAR PARSER ARCHITECTURE WITH MINI PARSERS

(75) Inventor: David M. Ungar, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 659 days.

(21) Appl. No.: 10/058,647

(22) Filed: Jan. 28, 2002

(65) Prior Publication Data

US 2003/0106049 A1  Jun. 5, 2003

Related U.S. Application Data

(60) Provisional application No. 60/334,274, filed on Nov. 30, 2001.

(51) Int. Cl.
*G06F 9/45* (2006.01)

(52) U.S. Cl. ........................ 717/143; 717/112
(58) Field of Classification Search ............ 717/143, 717/112; 709/202; 704/9, 4; 707/4
See application file for complete search history.

(56) References Cited

U.S. PATENT DOCUMENTS

| | | | | |
|---|---|---|---|---|
| 4,686,623 A * | 8/1987 | Wallace | ............ | 717/143 |
| 4,887,212 A * | 12/1989 | Zamora et al. | ............ | 704/8 |
| 4,914,585 A * | 4/1990 | Packard et al. | ............ | 716/18 |
| 5,060,155 A * | 10/1991 | van Zuijlen | ............ | 704/9 |
| 5,157,759 A * | 10/1992 | Bachenko | ............ | 704/266 |
| 5,386,570 A * | 1/1995 | Lindhorst | ............ | 717/146 |
| 5,687,378 A * | 11/1997 | Mulchandani et al. | ............ | 717/131 |
| 5,812,760 A * | 9/1998 | Mendenhall et al. | ............ | 714/49 |
| 5,878,273 A * | 3/1999 | Wise et al. | ............ | 710/5 |
| 5,903,756 A * | 5/1999 | Sankar | ............ | 717/106 |
| 6,226,291 B1 * | 5/2001 | Chauvel et al. | ............ | 370/392 |
| 6,268,874 B1 * | 7/2001 | Niu et al. | ............ | 345/506 |
| 6,275,791 B1 * | 8/2001 | Weise | ............ | 704/9 |
| 6,292,186 B1 * | 9/2001 | Lehman et al. | ............ | 345/705 |
| 6,307,546 B1 * | 10/2001 | Wickham et al. | ............ | 345/771 |
| 6,377,999 B1 * | 4/2002 | Bartas | ............ | 709/236 |
| 6,385,769 B1 * | 5/2002 | Lewallen | ............ | 717/125 |
| 6,397,263 B1 * | 5/2002 | Hancock et al. | ............ | 719/322 |
| 6,397,383 B1 * | 5/2002 | Chang et al. | ............ | 717/142 |
| 6,493,662 B1 * | 12/2002 | Gillam | ............ | 704/9 |
| 6,512,775 B1 * | 1/2003 | Eleftheriades et al. | ............ | 370/428 |
| 6,523,172 B1 * | 2/2003 | Martinez-Guerra et al. | . | 717/143 |
| 6,611,524 B1 * | 8/2003 | Devanagondi et al. | ... | 370/395.5 |
| 6,732,153 B1 * | 5/2004 | Jakobson et al. | ............ | 709/206 |

(Continued)

FOREIGN PATENT DOCUMENTS

EP    710027 A2 *  5/1996

(Continued)

OTHER PUBLICATIONS

Support for Modular Parsing in Software Reengineering, Peake et al, IEEE, Jul. 1997, pp. 58-66.*

(Continued)

*Primary Examiner*—Todd Ingberg
(74) *Attorney, Agent, or Firm*—Zagorin O'Brien Graham LLP (57) ABSTRACT

A modular parser architecture and methods related thereto make use of a number of miniparsers. Each miniparser is capable of receiving input and generating an output dependent thereon. In one embodiment, a lexer or a miniparser capable of lexical analysis receives certain code and provides an abstract syntax tree. Each miniparser performs operations on a set of syntactical constructs to produce a corresponding output syntax tree, which in turn may become an input syntax tree for a next miniparser which may operate on a different set of syntactical constructs.

26 Claims, 5 Drawing Sheets

U.S. PATENT DOCUMENTS 6,772,190 B1 * 8/2004 Hodjat et al. ............... 709/202

FOREIGN PATENT DOCUMENTS

WO      WO9600436    *   1/1996   ............... 717/143

OTHER PUBLICATIONS

IBM Technical Bulletin, Mar. 1, 2002, System and Method For JAVA serialization Compatibility using XML, 2 pages.*
Compilers Principles, Techniques and Tools, Aho et al, Chapters 1-5, Sep. 12, 1985.*
"Three Models For Descriptions of Languages", Noam Chomsky, MIT, 1956, IRE Trans. Infor, Theory, pp. 113-124.*
The Web Server Book, Janathan Magid et al, published Jul. 28, 1995, Chapters 1 and 11.*
JAVA!, Tom Richey, Sep. 22, 1995, Chapters 1, 12-14.*
Beck, Kent, Smalltalk Best Practice Patterns, 1997 by Prentice Hall PTR, pp. 13-16, pp. 171-189.
Calingaert, Peter, Assemblers, Compilers, and Program Translation, 1979 Computer Science Press, Inc., pp. 73-232.

* cited by examiner

MODULAR PARSER ARCHITECTURE WITH MINI PARSERS

CROSS REFERENCE TO RELATED APPLICATIONS

This application claims the benefit of U.S. Provisional Application No. 60/334,274, filed Nov. 30, 2001, which is incorporated herein by reference in its entirety.

BACKGROUND

1. Field

The invention relates to parsing technology, in particular, to techniques for decomposing a complex parser, such as for a computer programming language, into successive passes of comparatively simple miniparsers that operate on the outputs of respective predecessor miniparsers.

2. Description of the Related Art

In computer technology, a parser is a program, usually part of a compiler, that receives input in the form of sequential source program instructions, interactive online commands, markup tags, or some other defined interface and breaks them up into parts (for example, the nouns (objects), verbs (methods), and their attributes or options) that can then be managed by other programming (for example, other components in a compiler). A parser may also check to see that all input has been provided that is necessary.

Parsers typically translate an input information encoding such as source code text into abstract syntax trees in two steps: first, a lexical analyzer or lexer transforms source code text into a series of tokens or word-like pieces; then a parser converts the tokens into a parse tree. Abstract syntax is a representation of data (e.g., a program being compiled) which is independent of machine-oriented structures and encodings and also of the physical representation of the data. In the case of compilation, the syntax is called concrete syntax and includes all the features visible in the source program such as parentheses and delimiters. The concrete syntax is used when parsing the program or other input, during which it is usually converted into some kind of abstract syntax tree. An abstract syntax tree (AST) is a data structure representing something which has been parsed, often used as a compiler or interpreter's internal representation of a program while it is being optimized and from which code generation is performed. The range of all possible such structures is described by the abstract syntax. A compiler's internal representation of a program will typically be specified by an abstract syntax in terms of categories such as "statement", "expression" and "identifier". This is independent of the source syntax (concrete syntax) of the language being compiled (though it may be similar). A parse tree is similar to an abstract syntax tree but it will typically also contain features such as parentheses which are syntactically significant but which are implicit in the structure of the abstract syntax tree.

Although interactive programming environments have found widespread acceptance, most classic parser architectures hail from an era of when computation was a scarce resource. Bottom-up parser generators have succeeded in two important goals: languages such as the BNF ("Backus Normal Form" or "Backus-Naur Form") provide a concise and elegant notation for the expression of a language's syntax, and parsing algorithms such as LR-1 parsing minimize the time and space required to actually perform a parse. The strengths of bottom-up parser generators were critical in the environments that prevailed in the last millennium, but make little difference in many projects today and in the future. For example, when virtual machines feature an interactive programming environment in which only individual methods are expected to be compiled at a time, and when software is developed on machines with fractional-gigahertz processors and hundreds of megabytes of main memory, a parser can afford decreased performance. Thus, parsing efficiency is not always as important as development time.

Moreover, the strengths of traditional parser architectures come with weaknesses. First, the grammar itself requires a parser. A grammar can provide a formal definition of the syntactic structure of a language which is often given in terms of production rules which specify the order of constituents and their sub-constituents in a sentence or string. Of course, the grammar parser can be generated from a grammar, but some time is needed to get over the bootstrap hump. Next, bottom-up, table-driven parsers can be difficult to modify. This problem is merely a specialized case of a challenge that dogs the heels of all nonprocedural languages; a change to the specification, in this case the grammar, frequently creates unanticipated consequences. With LR parser generators, this issue typically surfaces when a programmer makes a change to the grammar only to discover that she has created unforeseen ambiguities. The hard-won description of the target language's grammar is concise but not malleable. Grammar-driven parsers require implementation effort for the grammar, and bottom-up grammar driven parsers can be brittle.

Even when a traditional, grammar-driven, parser has been tweaked to accept the desired grammar, the parser's output leaves much to be desired. A grammar-driven parse produces a concrete syntax tree, whose topology results from the hierarchical relationships between the grammar's productions. But the grammar is as much a function of what is parsable by a particular algorithm as it is of the target syntax. For example, left- or right-recursion in the grammar can induce a tall, skinny subtree when a short, flat one would be better. Or, if the grammar is incompletely factored as happens all too often, different kinds of tree nodes may redundantly implement the same semantic construct, reflecting its contextual syntactic legality instead of its meaning. Therefore, the choice to employ a grammar-driven parser frequently implies a commitment to write a post-processing system to clean up and reshape the parse tree. Not only does this system add implementation effort to a parser, but it also further impedes malleability. Whenever the grammar is perturbed, the tree postprocessor must also change.

Traditional parsers typically use a top-down recursive-descent parsing algorithm. A traditional such parser would recursively descend the grammar, traversing each token once (modulo look-ahead), in order to build the final parse tree. For example, in a typical implementation of a recursive-descent parser, at every juncture, each possibility must be tried. Because an attempt may fail, each token may actually be examined may times. Each stage of the parse must correctly choose between all possible results that could possibly start with what has already been parsed. But the only data available to make this decision are the tokens lying ahead in the input stream. Recursive descent optimizes performance but makes it harder to generate a correct parse.

SUMMARY

A modular parser includes a number of miniparsers. Each miniparser is capable of receiving input and generating an output dependent thereon. In one embodiment, a lexer or a miniparser capable of lexical analysis receives certain code and provides an abstract syntax tree. Another miniparser receives the abstract tree and performs certain operations on the input abstract syntax tree and generates an output abstract syntax tree. Other miniparsers each receive an input syntax tree and generate corresponding output syntax tree. Each miniparser performs operations on a set of syntactical constructs to produce the corresponding output syntax tree, which in turn may become an input syntax tree for a next miniparser.

In one embodiment of the present invention, a multipass parser implementation includes more than one miniparser. Each miniparser is successively operable on a respective abstract syntax tree. The abstract syntax tree corresponds to an input information encoding and includes transformations of predecessor ones of the miniparsers, if any. Respective ones of the miniparsers are limited to particular subsets of syntactic constructs to be parsed in the input information encoding. The multipass parser implementation may be embodied as a computer program product encoded in at least one computer readable medium. The multipass parser implementation may be embodied as or within a software engineering tool.

In another embodiment of the present invention, a method of implementing a parser for an input information encoding includes defining a succession of miniparsers. Each miniparser is operable on a respective parse state resulting from a predecessor one of the miniparsers. Each of the miniparsers recognizes only a particular subset of syntactic constructs to be parsed in the input information encoding. In a further embodiment, the method further includes executing the miniparsers in succession.

In another embodiment of the present invention, a method of parsing an information encoding includes performing plural successive transformations on successive abstract syntax trees, each abstract syntax tree formed as a result of a predecessor one of the transformations. Each of the successive transformations handles only a subset of syntactic constructs to be recognized in the information encoding.

In another embodiment of the present invention, a computer program product is encoded in at least one computer readable medium. The computer program product includes functional encodings of at least two miniparsers. A first one of the miniparsers is executable to transform a first parse tree into a second parse tree, and a second one of the miniparsers is executable to transform the second parse tree into a third parse tree. Each of the at least two miniparsers recognizes only a subset of syntactic constructs to be parsed in an information encoding to which the first, second and third parse trees correspond.

In another embodiment of the present invention, an apparatus includes encoded information and a multipass means. The encoding of information is substantially in accordance with a grammar. The multipass means is for performing a number of successive transformations on the encoded information. Each successive transformation handles only a subset of syntactic constructs in accordance with the grammar.

The foregoing is a summary and thus contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, will become apparent in the detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DESCRIPTION OF EMBODIMENTS

The following discussion is intended to provide a detailed description of at least one example of the invention to aid those skilled in the art to understand and practice the invention. For example, FIG. 1 and the following figures and discussion describe an exemplary miniparser architecture. This exemplary miniparser architecture provides a useful reference in discussing various aspects of the invention. Of course, the description of the architecture has been simplified for purposes of discussion, and it is just one of may different types of appropriate architectures that may be used in accordance with the invention. Consequently, the following discussion should not be taken to be limiting of the invention itself. Rather, any number of variations may fall within the scope of the invention which is properly defined in the claims following this description.

Figure 1:
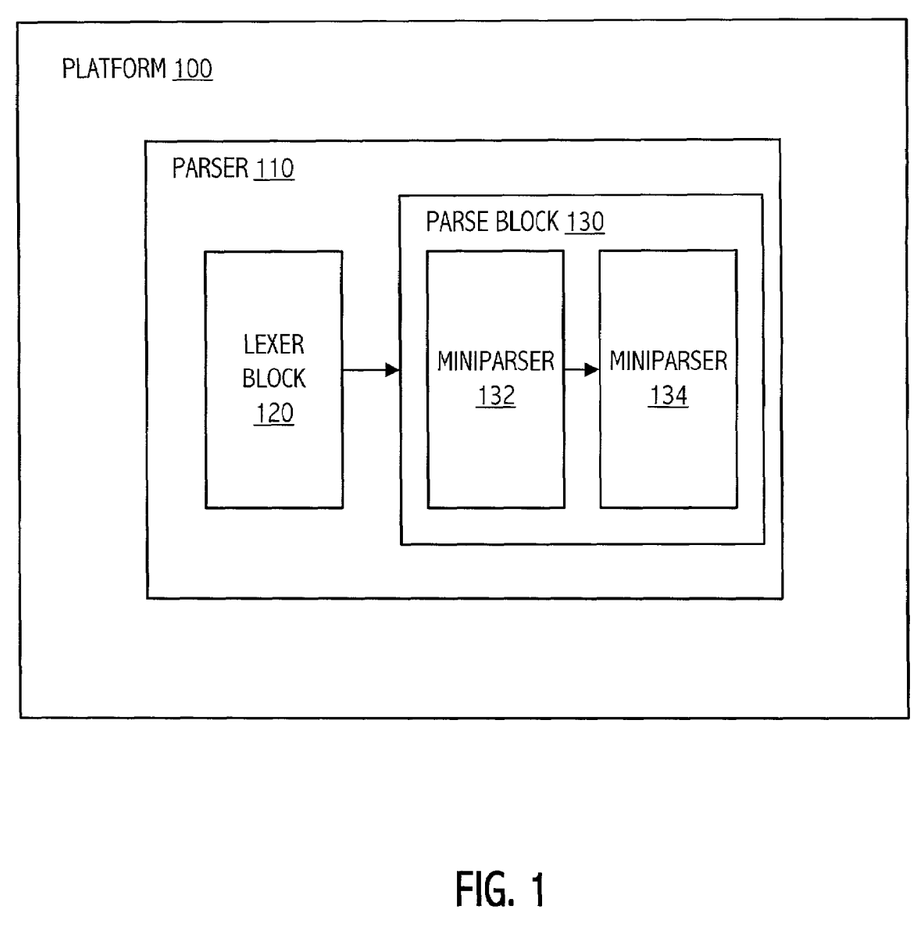
FIG. 1 is a block diagram illustrating an exemplary modular parser architecture.

FIG. 1 shows an architectural model of a top down, modular parser 110. Platform 100 includes parser 110. Parser 110 includes a lexer block 120 and a parse block 130. Parser 110 first lexes the source into tokens and then parses the tokens into a parse tree and/or abstract syntax tree. Lexer 120 performs a lexical analysis to convert source strings to tokens, and parse block 130 builds the abstract syntax trees (ASTs), for example, from sequences of the tokens. A regular-expression-based lexer or another type of lexer may be used. Other parsers may or may not include a lexer block 120.

Parse block 130 includes a number of miniparsers. In the example shown in FIG. 1, parse block 130 includes two miniparsers 132 and 134. Parse block 130 may include more miniparsers. As will be discussed with reference to FIG. 2, an exemplary list of miniparsers may include a comment parser, a grouping element parser, a compilation unit parser, a name parser, a class-level statement parser and a expression parser, among others. Although often differentiated from parsers, lexer block 120 may be classified as a miniparser in some implementations.

Parser 110 does not attempt to make a single leap from tokens to fully-parsed trees. Instead, parser 110 decomposes the task of parsing into multiple, simple passes to be performed by miniparsers 132, 134, for example. Each pass is referred to as a miniparse and operates on a respective parse state received from a previous miniparser or received as an initial input of coded information. Each pass takes the output of the previous miniparse pass, if applicable, and produces a new parse tree for a successor miniparser, if applicable. Each parser processes an abstract syntax tree from a previous parser, if applicable, according to a particular subset of syntactic constructs such as comments, delimiters or grouping elements, names, class-level statements, expressions, etc.

Parser 110 performs at least the following two functions: (i) parsing, and (ii) representing the results of the parse. These functions may be represented by the same hierarchy of objects, or they may be represented by two disparate inheritance families of objects, one to parse, and the other to represent the parsed abstract syntax tree. Exemplary parser 110 follows the latter approach. The state for each function has a different lifetime, and the parsing state may only exists while parsing. Also, the parse node objects in the abstract syntax tree can be structured according to their meaning as opposed to their syntax. This division works well with the miniparsers doing the parsing, and the parseNodes objects being name-spaces that hold the parse nodes.

A short example illustrates the multipass approach to parsing. When referring to each successive parse, the following exemplary source file named "main.java" will be used:
  package aPackage; // my package
  class MyClass { . . . }

Figure 2:
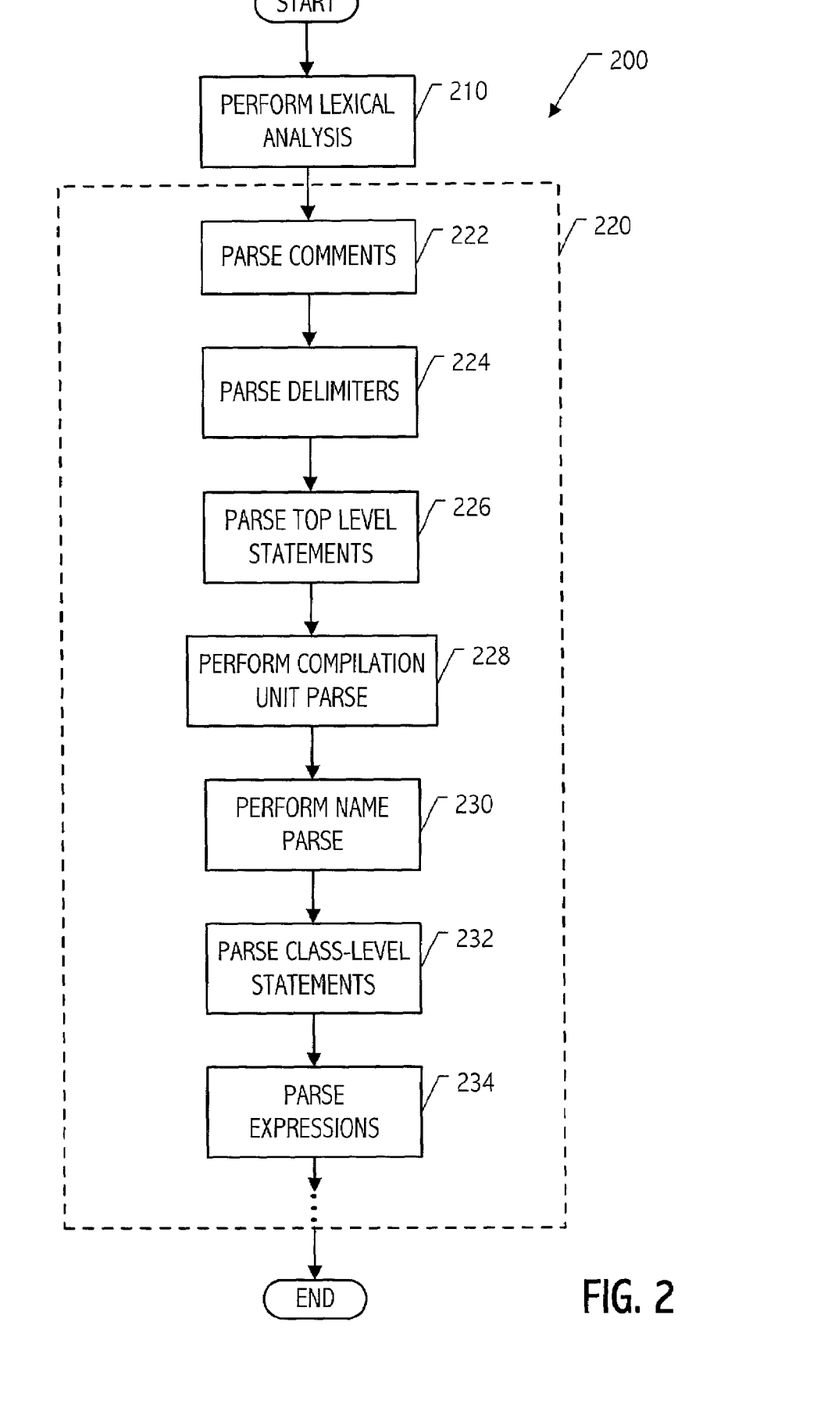
FIG. 2 is a block diagram illustrating the operation of an exemplary modular parser.
Figure 3:
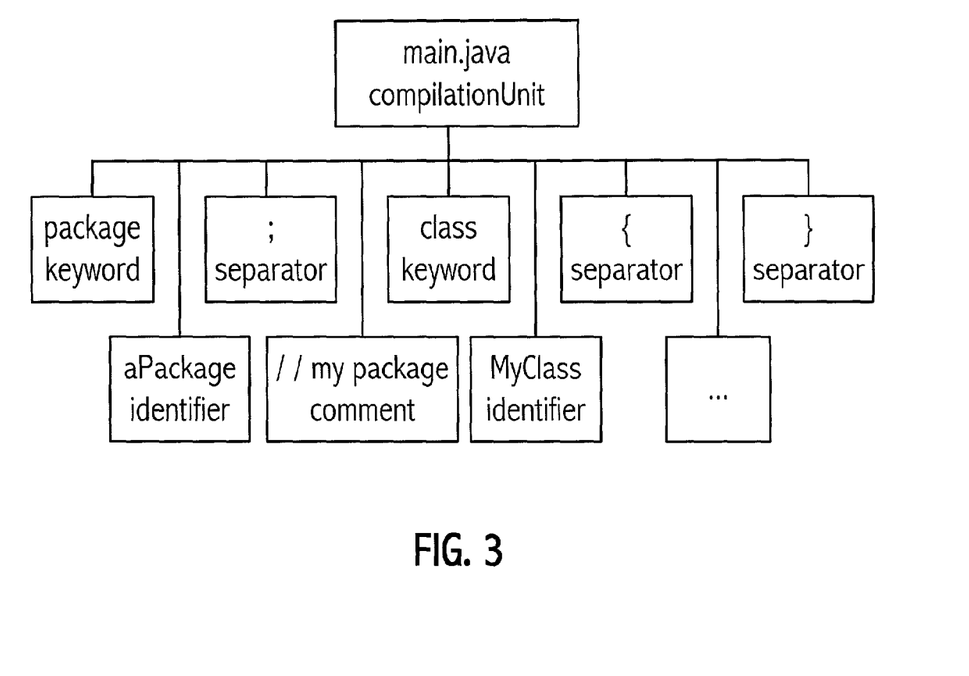
FIG. 3. is a block diagram illustrating an abstract syntax tree of an exemplary source program after lexical analysis.

FIG. 2 shows an operational flow 200 of one example of a modular parser. As shown in FIG. 2, the first miniparser of parser 100 is a lexer. During perform lexical analysis operation 210, lexer 110, for example, produces a short, wide, flat parse tree as shown in FIG. 3. The resulting parse tree has one subnode for each token. (In FIGS. 3–7, each box represents a parse tree node, and each box contains the corresponding source code at the top and the node type name at the bottom.) After perform lexical analysis operation 210 and during parse operations 220, a number of successive parse operations are performed. Different miniparsers and miniparse operations may be used within parse operations block 220.

Figure 4:
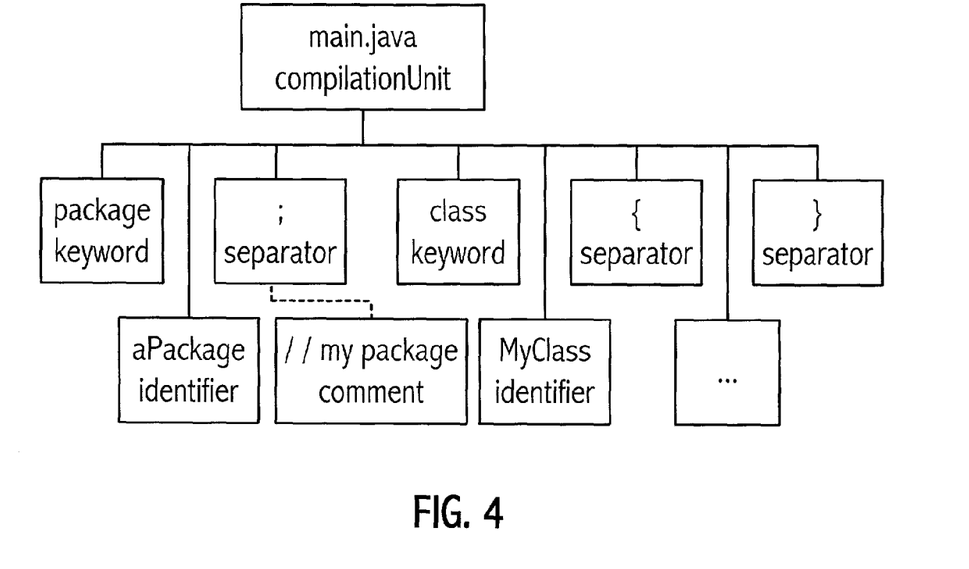
FIG. 4. is a block diagram illustrating an abstract syntax tree of an exemplary source program after a miniparser operation.
Figure 5:
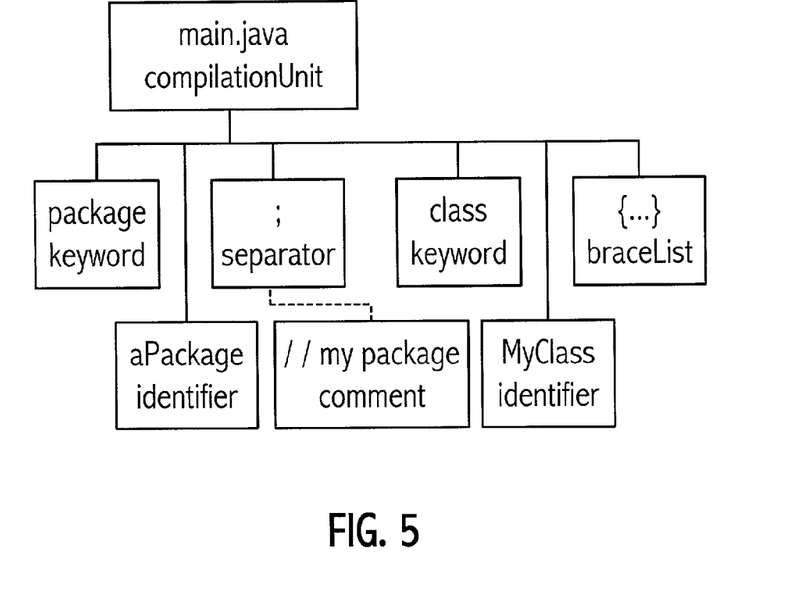
FIGS. 5–7. are block diagrams illustrating abstract syntax trees of an exemplary source program after successive miniparser operations.

In FIG. 2, after perform lexical analysis operation 210 and during parse comments operation 222, the next miniparser (e.g., miniparser 132) finds all the comment tokens. For each comment token, the comment miniparser uses a heuristic to determine if the comment belongs with the next noncomment token or the previous one noncomment token. The comment miniparser then hangs the comment token on the appropriate noncomment token by attaching it to one of two lists: one for prior comments and one for subsequent comments. The comments are not really subnodes of the noncomment; rather, they are kept with the noncomment for other, non-parsing tasks such as structured editing. In the exemplary java program main.java, there is one comment, and it goes with the preceding semicolon. Thus, as shown in FIG. 4, the comment miniparser removes comment tokens from the first level of the tree and reattaches them to the appropriate noncomment token.

Referring again to FIG. 2, after parse comments operation 222 and during parse delimiters 224, another miniparser (e.g., miniparser 134) matches up parenthesis, brackets, braces and like delimiters or grouping elements, which may be individual characters or collections of characters, explicit or implied. In the presently described embodiment, the matching of balanced delimiters has been concentrated in the delimiter miniparser for simplification and efficiency purposes. A more complex option is to interleave parenthesis matching in the manifold parts of the parser that deal with expressions, for-loops, while-loops, and so on. Referring again to the exemplary java program, there is only one such list, the body of the class. Accordingly, this operation creates the parse tree shown in FIG. 5 in which the delimiters are matched and the corresponding tokens are moved to their own subtrees. Although not shown in FIG. 5, the braceList node would have all of the tokens that were originally between the braces (including the braces themselves) as subnodes.

Figure 6:
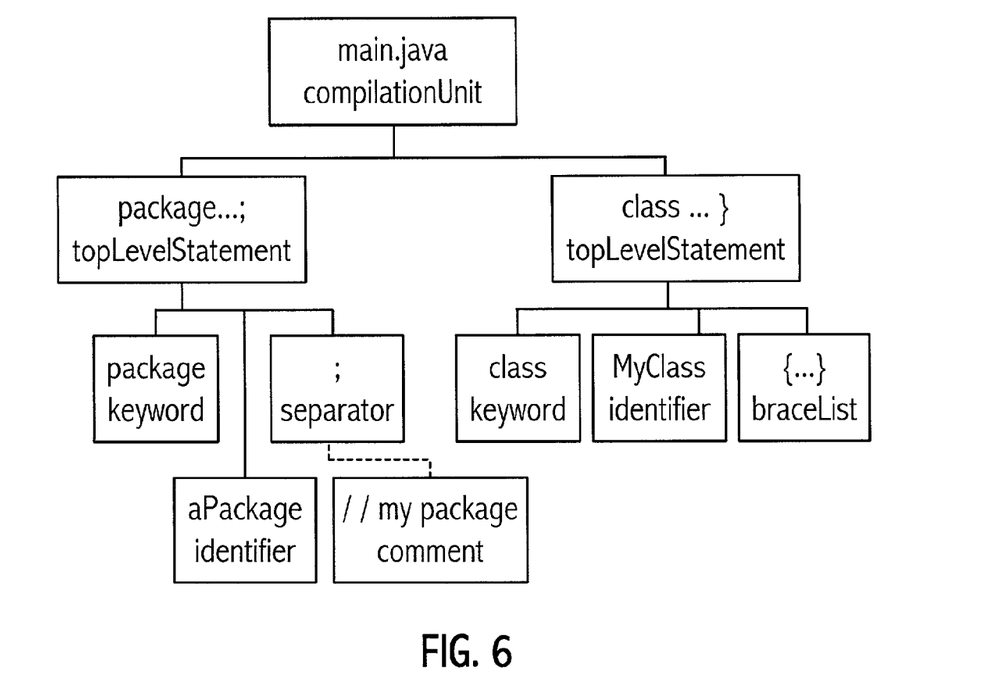

Referring again to FIG. 2, parse top level statements operation 226 follows parse delimiters operation 224. In a Java compilation unit, the top-level statements all end in semicolons or text in braces. Since parser 110 has already reshaped the parse tree according to parentheses and braces in parse delimiters operation 224, any semicolons or bracelists at the top level of the tree must end top-level statements. Accordingly, the next miniparser breaks the compilation unit into top-level-statements. Referring to FIG. 6, after our exemplary java code has been broken up into these statements, the first level of the tree contains one parse node per statement. Since the statements themselves have not been parsed yet, the types of each first-level node are all the same, "topLevelStatement."

Figure 7:
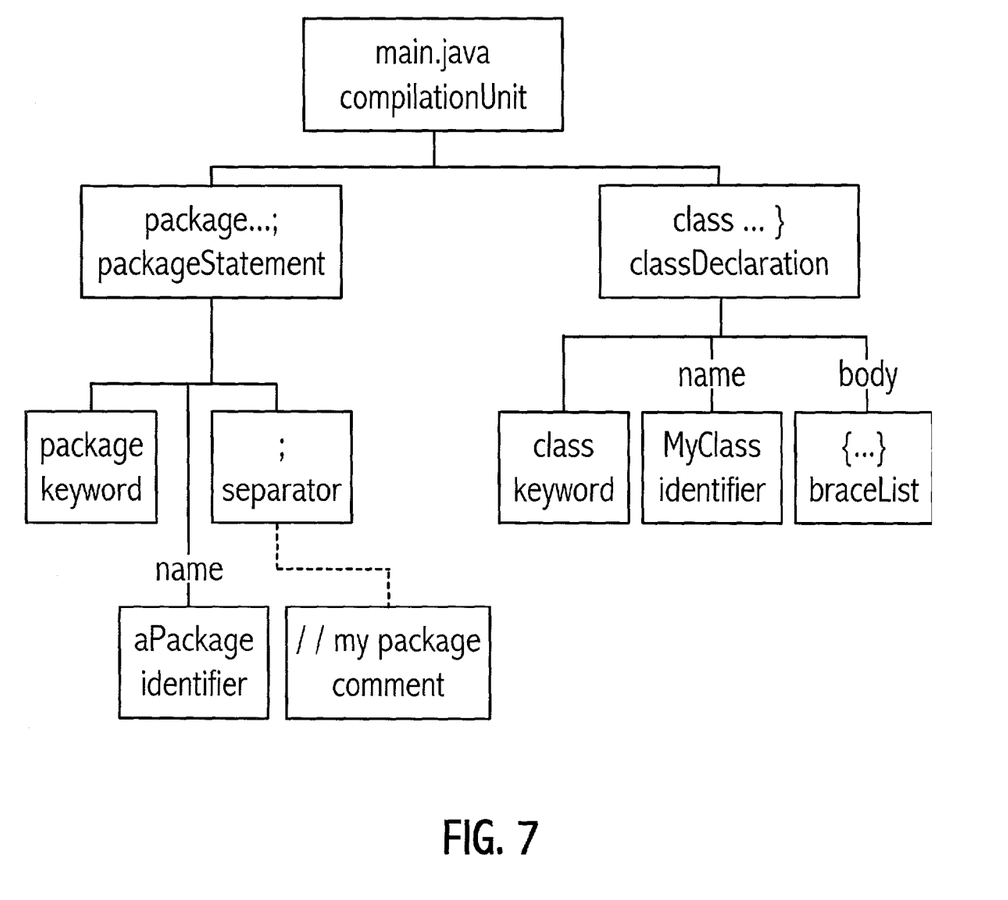

Now, each top-level-statement can be visited and parsed. As shown in FIG. 7, after each top level statement has been parsed, the resultant tree has statement-specific nodes for the statements. Thus, the first statement is represented by a packageStatement node possessing a method called "name" that can be used to access the subtree that holds the package name. Likewise, the second statement is represented by a classDeclaration node that has "name" and "body" methods.

Thus, the first several miniparsers of the above description perform the following operations:
 1. Lexically analyzing the input to produce a flat token tree,
 2. Removing comment tokens and reattaching them inside the noncomment tokens,
 3. Matching parentheses, brackets and braces to produce a hierarchical parse tree,
 4. Dividing up the top-level of a Java compilation unit into statements terminated by either a semicolon or a curly-bracket list As shown in FIG. 2, other parse operations may be performed such as perform name parse operation 230, parse class-level statements operation 232 and parse expressions operation 234, just to name a few. For example, a name parser parses qualified names such as those in package and import statements. A class-level statement parser parses individual statements within a class. An expression parser parses expressions.

This modular architecture trades off any extra cycles that may occur to revisit the same portion of the program to be parsed for the simplicity of constructing each miniparser. However, this is not really a significant trade off, if at all, because even a standard, recursive descent parser may scan the same tokens more than once, either to look ahead to choose the correct nonterminal to parse, or to back up and try an alternative when a choice is revealed to be incorrect.

In the embodiments described herein, functional decomposition has been used to modularize parser 110. Moreover, parser 110 nodes are immutable. Once a parse node's creation is complete, none of its state may further change. Instead of rearranging a parse tree it receives, a miniparser produces a new tree. Since subtrees are immutable, the new tree is free to reuse the subtrees of the old one. The functional programming paradigm confers two benefits in this context: ease of debugging and the a priori elimination of bugs. Since a miniparser does not alter its input, both its input and output are available for inspection when debugging a miniparser. And since parse trees are immutable, a class of bugs resulting from mutating shared objects is eliminated. Based on the teachings herein, functional programming is a good match for the intermediate and final results of a multipass parser.

Each miniparser contains mutable states to perform its parse. For example the parenthesis matcher has a stack of umatched opening parentheses that have been seen so far in the parse. Therefore, parser 110 implements a specialization hierarchy of miniparsers that is completely separate from its hierarchy of parse node objects. This dichotomy facilitates the task of decoupling the form of the parse tree from the specifics of the grammar. The miniparsers reflect the grammar, and the parse node hierarchy reflects the semantic content.

The architecture of parser 110 also allows clearer error messages. A bottom-up, generated parser can only output error messages on the mechanical syntactic level, admonishing the user about what sorts of tokens would have been legal. The user is left to try to figure out why. See, for example, the C compiler's obscure "missing semicolon" message. A recursive-descent compiler has only unparsed tokens to look ahead to, and so cannot delimit the extent of the relevant portion of the program. Parser 110 can supply more helpful error messages, since the error messages may be written by hand and may also talk about appropriate regions of code. For example, an error in a package declaration can highlight the entire declaration statement if appropriate.

One embodiment of parser 110 has been implemented in Self, a prototype-based dynamic object-oriented language. The reflective facilities available in Self (as in Smalltalk and Lisp) allowed simplification of the lexer, and object-oriented habits militate towards representation of everything as objects in specialization hierarchies, including tokens. These facets of parser 110 are beneficial but not essential.

One embodiment of parser 110 has been divided into a general-purpose parser kit and a refinement specifically for Java. The Java parser consists of two global-name-space objects (akin to Java packages), each of which belongs to a separate module. The parseKit module contains classes for lexing (the lexer), parsing (the parser), sample objects, and a testing framework. The javaParser module specializes the parseKit to create a parser for the Java language. Its name space overrides corresponding objects in parseKit.

The above description is intended to describe at least one embodiment of the invention, not to define the scope of the invention. Rather, the scope of the invention is defined in the claims that follow this description. Thus, other embodiments of the invention include other variations, modifications, additions, and/or improvements to the above description.

For example, FIG. 1 shows a modular parser architecture resident on platform 100. Platform 100 may be any appropriate platform for parser 110. For example, platform 100 may be a computer system or any other type of information processing system, wholly or partially integrated on-chip, on-board, in-box or distributed. In such embodiments, the blocks of FIG. 1 may be hardware, software or combinations thereof. In other embodiments, platform 100 may be one or more computer readable media. In such embodiments, the blocks of FIG. 1 may be software which is wholly or partially resident on platform 100 or received by transmission via platform 100.

Computer readable media may include, for example and without limitation, any number of the following: magnetic storage media including disk and tape storage media; optical storage media such as disc media (e.g., CD-ROM, CD-R, DVD-ROM, etc.); nonvolatile memory storage media including semiconductor-based memory units such as FLASH memory, EEPROM, EPROM, ROM; ferromagnetic digital memories; holographic media, volatile storage media including registers, buffers or caches, main memory, RAM, etc.; and data transmission media including computer networks, point-to-point telecommunication equipment, and carrier wave transmission media, just to name a few. Other new and various types of computer-readable media may be used to store and/or transmit the software modules discussed herein.

Also, those skilled in the art will recognize that boundaries between logic blocks are merely illustrative and that alternative embodiments may merge logic blocks or circuit elements or impose an alternate decomposition of functionality upon various logic blocks or circuit elements. For example, miniparsers 132 and 134 may be directly resident on platform 100 independent of any overarching parse block 130. Moreover, alternative embodiments may combine multiple instances of a particular component (e.g., more miniparsers within parse block 130.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, various wireless devices and embedded systems. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process.

From an operational perspective, each block of FIGS. 1 and 2 show an exemplary operation or set of operations which are performed in succession as shown. These operations may be performed in whole or in part by hardware, software, combinations thereof, or even through interactive action from independent actors. Each of the blocks/operations of FIG. 2 may be executed by a module (e.g., a software module) or a portion of a module. Thus, the above described method(s), the operations thereof and modules therefor may be executed on a computer system configured to execute the operations of the method and/or may be executed from computer-readable media. The method and/or modules may be embodied in a computer-readable medium for configuring a computer system to execute the method. Thus, the software modules may be stored within and/or transmitted to a computer system memory to configure the computer system to perform the functions of the module. Software modules may include script, batch or other executable files, or combinations and/or portions of such files.

Those skilled in the art will recognize that boundaries between the functionality of the above described operations/modules are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. Likewise, those skilled in the art will recognize that boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

The components and devices described herein are used as examples for sake of conceptual clarity. Consequently, as used herein these specific exemplars are intended to be representative of their more general classes. Furthermore, in general, the use of any specific exemplar herein is also intended to be representative of its class and the non-inclusion of any specific devices in any exemplary lists herein should not be taken as indicating that limitation is desired.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a non-limiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that the element not be limited to one and only one of the feature described merely by the incidental use of the definite article.

Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, it will be obvious to those skilled in the art that, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a non-limiting or nonexclusive example, whether or not the terms non-limiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A multipass parser implementation encoded on at least one computer-readable medium, the multipass parser implementation comprising:
   plural miniparsers each successively operable on a respective abstract syntax tree that corresponds to an input information encoding and that includes transformations of predecessor ones, of the miniparsers,
   wherein respective ones of the miniparsers are limited to particular subsets of syntactic constructs to be parsed in the input information encoding.

2. The multipass parser implementation of claim 1,
   wherein, for at least some of the miniparsers, the respective abstract syntax tree is an output of a respective predecessor one of the miniparsers.

3. The multipass parser implementation of claim 1,
   wherein, for at least some of the miniparsers, respective input and output abstract syntax trees are separately encoded.

4. The multipass parser implementation of claim 1,
   wherein the syntactic constructs are those of a programming language; and
   wherein the information encoding includes code substantially in accordance therewith.

5. The multipass parser implementation of claim 1,
   wherein operation of each of the miniparsers is on a substantial entirety of its respective abstract syntax tree.

6. The multipass parser implementation of claim 1,
   wherein the syntactic constructs are those defined by a grammar; but wherein none of the miniparsers individually implements the grammar.

7. The multipass parser implementation of claim 1,
wherein the syntactic constructs are those defined by a grammar; and
wherein the operation of successive ones of the miniparsers corresponds to the grammar.

8. The multipass parser implementation of claim 1, wherein the plural miniparsers include:
a comment parser;
a delimiter parser;
a top-level statement parser;
a compilation unit parser; and
a name parser.

9. The multipass parser implementation of claim 1,
wherein the plural miniparsers correspond to an hierarchy of functional transformations.

10. The multipass parser implementation of claim 1, embodied as a computer program product encoded in at least one computer readable medium.

11. The multipass parser implementation of claim 10,
wherein the at least one computer readable medium is selected from the set of a disk, tape or other magnetic, optical, or electronic storage medium and a network, wireline, wireless or other communications medium.

12. A software engineering tool including the plural miniparsers of claim 1.

13. A method of implementing a parser for an input information encoding, the method comprising:
defining a succession of miniparsers each operable on a respective parse state resulting from a predecessor one of the miniparsers,
wherein each of the miniparsers recognizes only a particular subset of syntactic constructs to be parsed in the input information encoding.

14. The method of claim 13,
wherein operation of each successive miniparser transforms an output of a predecessor miniparser.

15. The method of claim 13,
wherein operation of each successive miniparser successively refines a parse tree that corresponds to the input information encoding.

16. The method of claim 13,
wherein operation of each successive miniparser produces a distinct parse tree that represents a successive refinement corresponding to the input information encoding.

17. The method of claim 13, further comprising:
executing the miniparsers in succession.

18. The method of claim 13,
wherein the syntactic constructs are those of a programming language; and
wherein the input information encoding includes code substantially in accordance therewith.

19. The method of claim 13,
wherein a first executed one of the miniparsers implements a lexer.

20. The method of claim 13,
wherein a first executed one of the miniparsers operates on a lexed encoding corresponding to the input information.

21. The method of claim 13, applied to a compilation unit of program code,
wherein an earlier executed one of the miniparsers associates comment tokens of a compilation unit with respective non-comment tokens; and
wherein a later executed one of the miniparsers matches grouping tokens.

22. The method of claim 21,
wherein a still later executed one of the miniparsers segregates tokens into top-level statements.

23. A method of parsing an information encoding, the method comprising:
performing plural successive transformations, each successive one of the transformations operating on an abstract syntax tree that is a result of a predecessor one of the transformations,
each of the successive transformations handling only a subset of syntactic constructs to be recognized in the information encoding.

24. A computer program product encoded in at least one computer readable medium and comprising:
functional encodings of at least two miniparsers, a first one of the miniparsers executable to transform a first parse tree into a second parse tree and the second one of the miniparsers executable to transform the second parse tree into a third parse tree;
each of the at least two miniparsers recognizing only a subset of syntactic constructs to be parsed in an information encoding to which the first, second and third parse trees correspond.

25. The computer program product of claim 24,
wherein the at least one computer readable medium is selected from the set of a disk, tape or other magnetic, optical, or electronic storage medium and a network, wireline, wireless or other communications medium.

26. An apparatus comprising:
encoded information substantially in accordance with a grammar;
multipass means for performing plural successive transformations on the encoded information, each successive transformation handling only a subset of syntactic constructs in accordance with the grammar.

* * * * *